(12) United States Patent
Tegerdine et al.

(10) Patent No.: US 11,395,103 B2
(45) Date of Patent: Jul. 19, 2022

(54) POSITIONING SYSTEM AND METHOD

(71) Applicant: Raytheon Systems Limited, Harlow (GB)

(72) Inventors: David R. Tegerdine, Fowlmere (GB); Timothy J. Palmer, Soham (GB); Peter A. Langsford, Great Dunmow (GB)

(73) Assignee: Raytheon Systems Limited, Harlow (GB)

( * ) Notice: Subject to any disclaimer, the term of this patent is extended or adjusted under 35 U.S.C. 154(b) by 39 days.

(21) Appl. No.: 16/946,566

(22) Filed: Jun. 26, 2020

(65) Prior Publication Data

US 2020/0413223 A1 Dec. 31, 2020

(30) Foreign Application Priority Data

Jun. 28, 2019 (GB) ..................................... 1909369

(51) Int. Cl.
*H04W 4/029* (2018.01)
*G01S 5/02* (2010.01)
(Continued)

(52) U.S. Cl.
CPC .......... *H04W 4/029* (2018.02); *G01S 5/0221* (2013.01); *G01S 5/0236* (2013.01); *G01S 5/0242* (2013.01);
(Continued)

(58) Field of Classification Search
CPC . G01S 5/10; G01S 5/14; G01S 13/878; G01S 13/222; G01S 2013/466; G01S 2013/468; G01S 5/0236; G01S 5/0252; G01S 5/06; G01S 5/00; G01S 5/0036; G01S 5/30; G01S 7/4865; G01S 5/26; G01S 11/08; G01S 11/16; G01S 1/24; G01S 2015/465; G01S 3/023; G01S 5/0009; G01S 5/0242; G01S 5/22; G01S 7/406; G01S 7/497; G01S 5/0221; H04W 56/001;
(Continued)

(56) References Cited

U.S. PATENT DOCUMENTS

2002/0098839 A1\* 7/2002 Ogino ..................... G01S 5/02
455/424
2003/0122711 A1 7/2003 Panasik et al.
(Continued)

FOREIGN PATENT DOCUMENTS

AU 2014277724 A1 1/2015
WO 2011042726 A1 4/2011

OTHER PUBLICATIONS

Combined Search and Examination Report in connection with UK Patent Application No. GB1909369.9 dated Dec. 2, 2019, 6 pages.
(Continued)

*Primary Examiner* — Daniel Lai

(57) ABSTRACT

Systems and methods determine a position using uncoordinated signals containing timing information. The systems and methods use uncoordinated signals of opportunity, such as radio time signals, to determine a position of a receiver by determining the relative synchronization of the signals of opportunity at a known location and, at a later time and unknown locations, using trilateration or multilateration of the signals of opportunity to determine the position of the receiver.

21 Claims, 4 Drawing Sheets

(51) Int. Cl.
*G01S 5/14* (2006.01)
*H04W 56/00* (2009.01)
*H04W 4/024* (2018.01)
*H04W 84/18* (2009.01)

(52) U.S. Cl.
CPC ............ *G01S 5/14* (2013.01); *H04W 56/001* (2013.01); *H04W 56/006* (2013.01); *H04W 4/024* (2018.02); *H04W 84/18* (2013.01)

(58) Field of Classification Search
CPC ....... H04W 64/00; H04W 4/02; H04W 4/029; H04W 4/023; H04W 4/025; H04W 4/33; H04W 56/00; H04W 64/003; H04W 64/006; H04W 56/0045; H04W 56/006; H04W 4/021; H04W 4/30; H04W 4/38; H04W 56/002; H04W 56/004; H04W 56/0055; H04W 56/0065; H04W 56/009; H04W 4/024; H04W 84/18; H04W 1/08

See application file for complete search history.

(56) References Cited

U.S. PATENT DOCUMENTS

| | | |
|---|---|---|
| 2004/0150557 A1 | 8/2004 | Ford et al. |
| 2009/0121940 A1* | 5/2009 | Ladd ............. G01S 5/0045 342/463 |
| 2013/0229303 A1* | 9/2013 | Marshall ............ G01S 5/12 342/357.29 |
| 2013/0235864 A1 | 9/2013 | Do et al. |
| 2013/0331121 A1 | 12/2013 | Bandyopadhyay et al. |
| 2016/0088429 A1* | 3/2016 | Gao ............. G01S 5/0045 455/456.1 |
| 2016/0146922 A1* | 5/2016 | Moshfeghi ............ G01S 5/0252 455/456.6 |
| 2016/0353238 A1 | 12/2016 | Gherardi et al. |
| 2017/0016870 A1 | 1/2017 | McPeek |
| 2017/0078851 A1* | 3/2017 | Agrawal ............ H04W 4/021 |
| 2020/0371193 A1* | 11/2020 | Marshall ............ G01S 5/0289 |

OTHER PUBLICATIONS

Combined Search and Examination Report in connection with UK Patent Application No. GB1909371.5 dated Dec. 2, 2019, 7 pages.
U.S. Appl. No. 16/946,565 entitled "Positioning System and Method" filed Jun. 26, 2020, 34 pages.

* cited by examiner

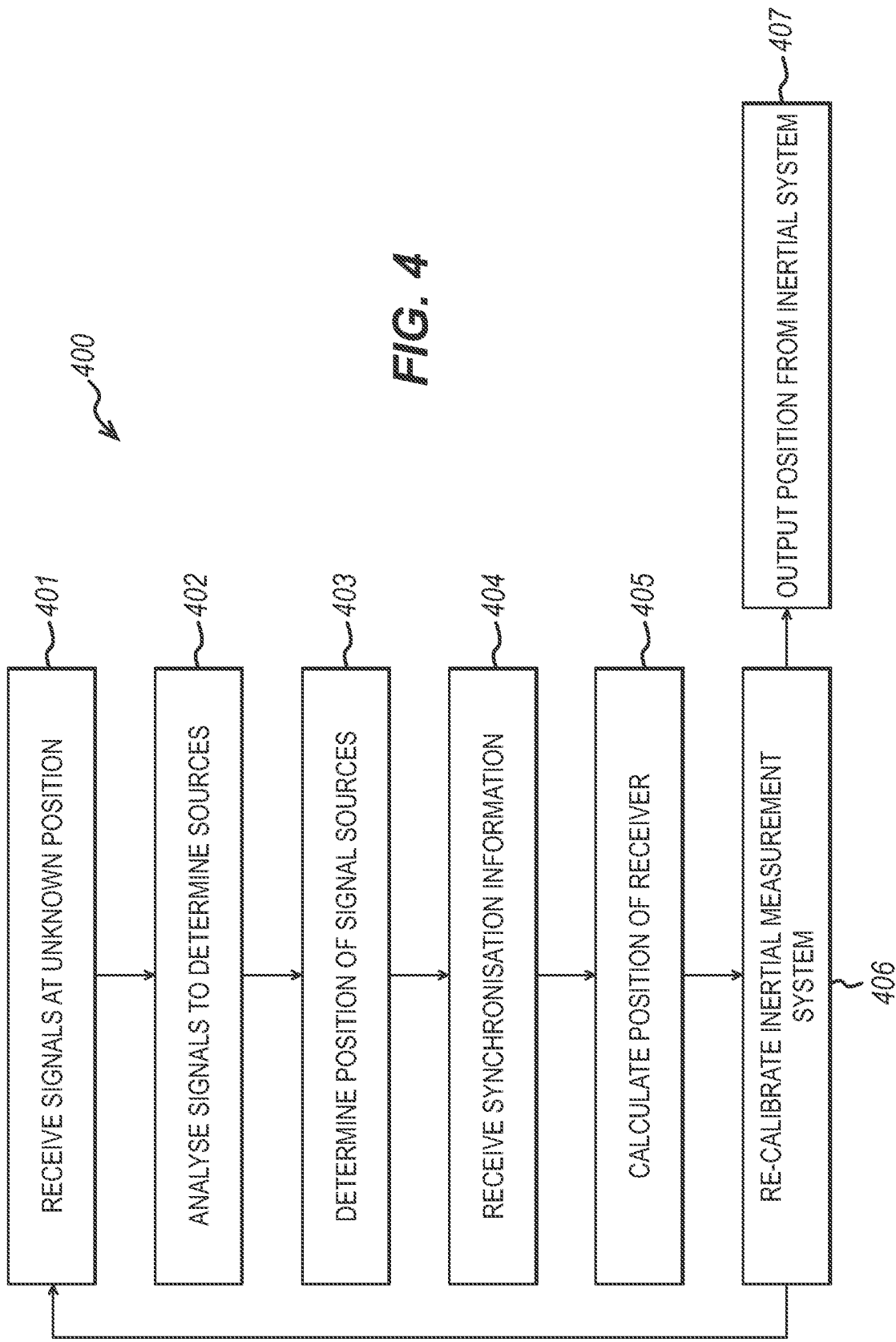

POSITIONING SYSTEM AND METHOD

CROSS-REFERENCE TO RELATED APPLICATION AND PRIORITY CLAIM

This application claims priority under 35 U.S.C. § 119 to United Kingdom Patent Application No. 1909369.9 filed on Jun. 28, 2019, which is hereby incorporated by reference in its entirety.

TECHNICAL FIELD

The present invention relates to systems and methods for determining a position using uncoordinated signals containing timing information.

BACKGROUND

GNSS (global navigation satellite systems) use satellites to provide geo-spatial positioning. A GNSS receiver receives signals from GNSS satellites and uses the known positions of the GNSS satellites to calculate the position of the receiver. One example of a GNSS system, GPS (global positioning system), uses a constellation of satellites that continuously transmit their current position and the time held by atomic clocks on board the satellites. A receiver monitors the signals from multiple satellites and uses the position and time transmitted by the GPS satellites to determine its own position.

However, GNSS signals are typically very weak so are easily blocked by buildings or geological features such as mountains or cliffs. The relatively weak signal strength makes it particularly easy for an attacker to broadcast a spoofed GNSS signal or to jam GNSS signals. Furthermore, the satellites themselves are a potential weak link in the chain—if a sufficient number of satellites malfunction or are otherwise rendered inoperative, the receivers on the ground will be unable to determine a geolocation.

Thus, GNSS systems have the disadvantage that if no source signal is available, for any of the reasons mentioned above, they are no longer able to determine a geolocation. Given the extensive reliance of civilian and military activities on GNSS services, there is therefore need for a positioning device which does not rely on such satellite-based positioning systems.

Modern alternatives to GNSS systems include inertial navigation systems which employ accelerometers, gyroscopes, etc. to provide relative position information (changing location from a known start point) through dead-reckoning techniques. Such systems do not require external signals and therefore have benefits where external signals cannot be obtained, either through the geography of the particular location of the device, or through interference or other interruption. However, such systems exhibit significant drift over time between actual and estimated positions. This means that these systems are ineffective over time and during extended periods where no external reference signal is available.

Accordingly, there is the need to provide a positioning device which can provide an indication of its position without reference to GNSS systems and which can maintain an accurate position estimate over long periods of time and large distances.

SUMMARY OF THE INVENTION

In a first aspect of the invention, there is provided a method for determining a position of a device, the method comprising a first series of steps of receiving, at the device, two or more electromagnetic signals, wherein each signal comprises timing information and is provided from a separate fixed terrestrial or geostationary source; determining a position of the source of each signal; retrieving, from a memory of the device, synchronization information defining the offsets between the timing information contained in each signal; and determining the position of the device based on the timing information of each signal, the synchronization information, and the positions of the each signal source.

The method may further comprise additional steps of receiving, at an initial known absolute position of the device, the two or more electromagnetic signals, determining a position of the source of each signal; determining the offset between the timing information contained in each signal based on the known position of the receiver and of the positions of the signal sources; and storing the offset as the synchronization information in the memory of the device. Preferably the initial known position of the device is determined based on the output of a co-located GNSS receiver or is manually input to the system.

In some embodiments, these additional steps may be repeated at one or more further known positions, wherein the synchronization information determined at the initial known position and the further known positions is refined and stored in the memory of the device.

Preferably these additional steps are repeated at a later point in time, and wherein the synchronization information stored in the memory of the device is replaced by the synchronization information determined at a later point in time.

Optionally, subsequent to determining the updated position of the device, the method further comprises repeating the first series of steps to determine a further updated position of the device.

Preferably, determining a position of the source of each signal comprises analyzing each received signal to determine characteristics of the received signal and retrieving, from a memory of the device, the position of the source of the received signal based on the determined characteristics of the signal.

Preferably, determining a position of the source of a received signal comprises identifying, within the received signal, an indication of the position of the source of the received signal.

Preferably, determining the position of the device comprises trilateration or multilateration.

The received signals may comprise one or more of: radio time signals, television signals, radio signals, ad-hoc signals, navigational aids, and non-directional beacons.

The method may further comprise broadcasting one or more signals comprising timing information from one or more ad-hoc transmitters at fixed terrestrial or geostationary positions and/or known moving positions, wherein one or more of the received electromagnetic signals are the signals broadcast from the one or more ad-hoc transmitters.

In a second aspect of the invention, there is provided a device configured to perform the methods described above.

In a third aspect of the invention, there is provided a system comprising the aforementioned device and an ad-hoc transmitter configured to broadcast a signal comprising timing information from a fixed terrestrial or geostationary source, or a source at a known moving position.

BRIEF DESCRIPTION OF THE DRAWINGS

FIG. 4 depicts a further positioning method of the present invention.

DETAILED DESCRIPTION

Figure 1:
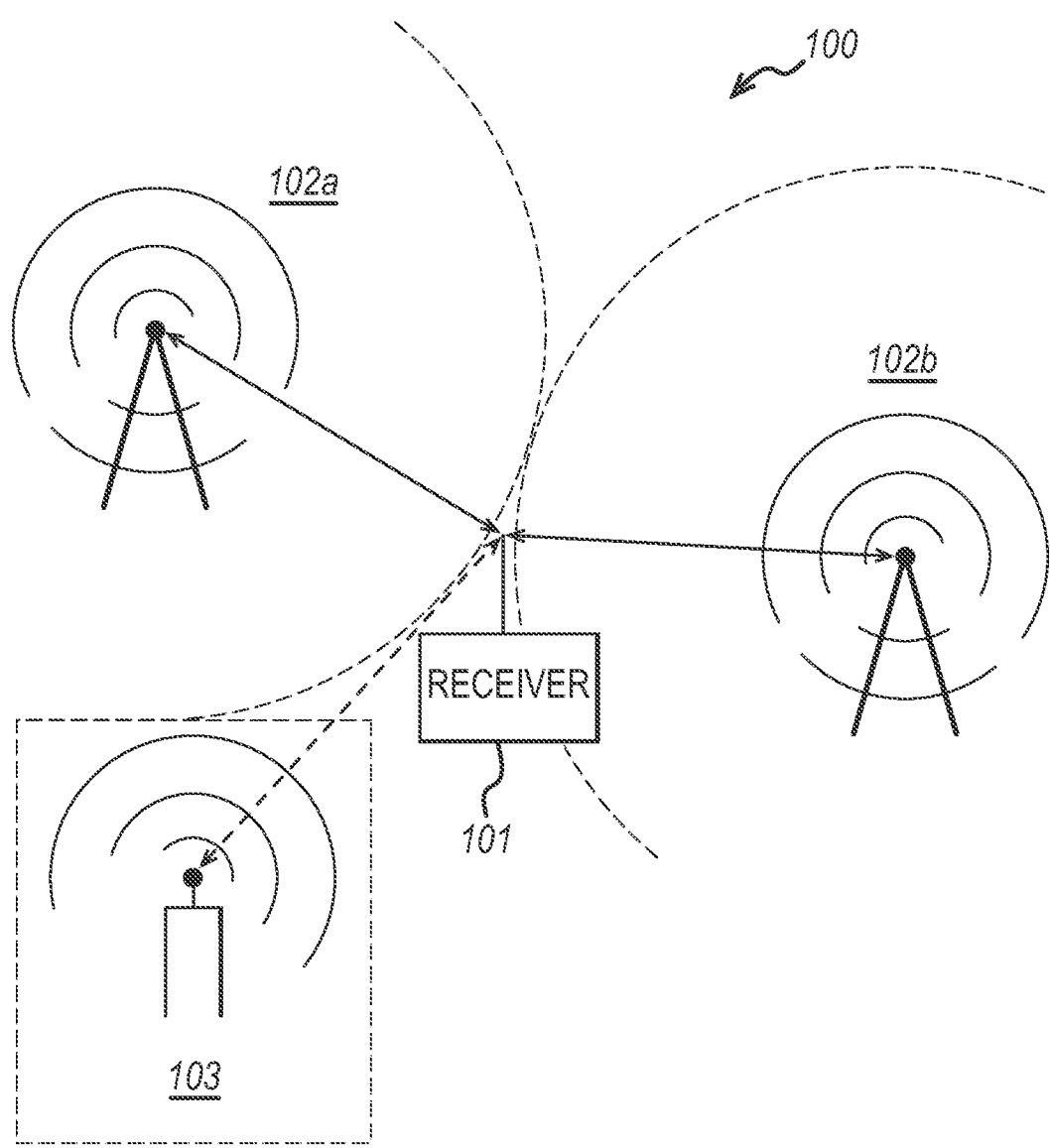
FIG. 1 shows an overview of the system of the invention.

The positioning system and method of the present invention solve the above mentioned problem of determining a position without reference to GNSS signals by using uncoordinated (and, possibly, non-cooperative) signals of opportunity containing timing information as references. In the present context, "uncoordinated" means that the broadcast of the signals occurs independently, without reference to one another. The term "signal of opportunity" means a signal broadcast by a third party that can be received at a given position. The timing information may include precise timing information encoded in the signal of opportunity, or may simply be a signal with an accurately timed repetitive structure. However, detailed knowledge of the signal structure is not necessarily required to obtain useful timing information that could be used as part of a position determination.

An example of uncoordinated signals of opportunity that are used by the present invention are radio time signals, also referred to as national time standards. Radio time signals are typically, but not exclusively, broadcast on the VLF and LF radio bands (e.g. 3 to 300 kHz) and have reasonably predictable radio propagation characteristics, resulting in low uncertainty in the received time signals. Because of their relatively long wavelength, these radio time signals tend to diffract over geological obstacles such as mountain ranges and follow the contour of the Earth. This means that radio time signals are receivable over very large areas, often overlapping with other radio time signals.

Of course, the present invention is not limited to using radio time signals as references. Other suitable signals of opportunity exist, such as TV and radio broadcast signals, ad-hoc signals (as described in more detail with respect to FIG. 4), and navigational aids, such as airport directional signals and non-directional beacons, or radio time signals broadcast on higher frequencies. It will be appreciated that this list is not exhaustive and any receivable signal containing timing information, such as an accurately timed repetitive structure, may be used. However, these signals may contain less accurate timing information or be more greatly influenced by radio propagation effects across large areas, so might only be used when other, more stable signals, such as a longwave radio time signal, are not available. Furthermore, medium and high frequency signals are more likely to travel as skywaves than low frequency signals, thus reflecting or refracting from the upper atmosphere back towards the earth. These reflections and refractions vary depending on the time of day, resulting in different effective paths from the signal source to a receiver, which makes these higher-frequency signals less consistent for use as a reference in a positioning system or method. Where signals reflect or refract, multipath propagation of those signals from the source to receiver can also cause undesirable interference at the receiver.

These signals are uncoordinated in that the timing information that is part of each signal is not synchronized to the timing references of the other signals. In GPS, for example, the clocks of the individual satellites are regularly resynchronized to ensure that the timing information in the signals broadcast by the satellites is synchronized. As another example, now-defunct hyperbolic/multilateration systems such as LORAN (and its various incarnations), in which a master station broadcast a signal first and a pair of permanently associated slave stations transmitted second and third in sequence. Hence, even though the individual stations were not necessarily synchronized, co-ordination between the stations was still an integral part of the system.

By using uncoordinated signals of opportunity, such as radio time signals, the positioning system and method of the present invention is particularly resistant to disruption and is highly resilient to failure of any individual signal source. Radio time signals in particular require large antennas, up to several hundred meters long, to broadcast at longwave frequencies. This makes it particularly difficult for an adversary to jam or otherwise interfere with radio time signals, making them reliable as references in a positioning system or method. Furthermore, radio time signals are broadcast on many different frequencies, making it even more difficult to jam or otherwise interfere with the time signals.

FIG. 1 depicts a system 100 according to the present invention in the context of multiple signals containing timing information. A receiver 101 is located in an environment where multiple signals of opportunity are present. Two signal sources 102a and 102b are depicted in FIG. 1, but it will be appreciated that any number of signals of opportunity from any number of sources may be used, if available. As discussed above, these signals contain timing information and may be, for example, a radio time signal. The sources 102a-b of the signals may be at fixed terrestrial positions or in geo-synchronous orbit, i.e. not moving relative to the surface of the Earth. The receiver 101 can be adapted to use signals broadcast by moving sources if continuous up-to-date knowledge of the source's position is available to the receiver. The receiver 101 is configured to determine a position, i.e. a position relative to the surface of the earth, such as longitude-latitude, based on the signals broadcast by sources 102a-b and, optionally, an ad-hoc source(s) 103, as explained in more detail below. The receiver 101 may include a memory that stores the known positions of the potential signal sources, including sources 102a-b, e.g. in a database. For example, most radio time signals are broadcast from known locations around the world. The MSF signal in the United Kingdom is broadcast from Anthorn Radio Station in Cumbria, at 54.911° N 3.280° W. Corresponding information is generally available for other radio time signals.

Figure 2:
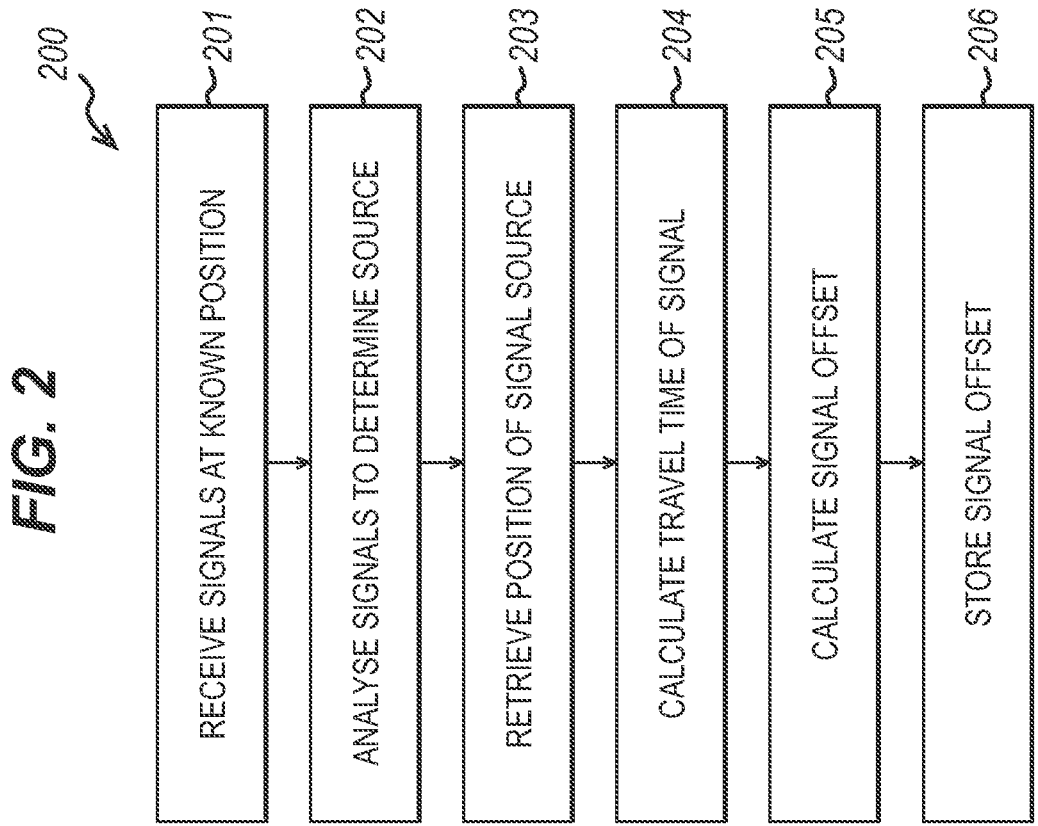
FIG. 2 depicts a calibration method of the present invention.

The memory or data store of the receiver 101 may also include characteristics of the signals that can be used a) to lookup a signal source's position based on characteristics of the signal, as described with respect to FIGS. 2 and 3 below, and b) as a reference so that a processor of the receiver 101 is able to decode the timing information contained in different signals. For example, different radio time signals encode timing information in different ways, and different algorithms must be employed to decode the timing information from the signals. Further characteristics that may be used to identify a given signal include physical characteristics of the signal, such as the amplitude, frequency or phase modulation contained within a signal, any embedded digital signaling, or the overall signal structure. Similarly, a known broadcast schedule may identify the signal, or even the signals themselves may even include some identifier.

The receiver 101 may also include a GNSS receiver and/or a clock, which can be used to provide a position when GNSS is available, or used to provide the initial known location for synchronization.

The receiver 101 may also include an inertial positioning system or other independent means of providing position information. If present, the inertial positioning system is used to provide short-term updates to the receiver's location using dead reckoning, as described in more detail below.

In order to determine the position of the receiver 101 using trilateration or multilateration it is necessary to know a) the positions of the signal sources 102a-b and b) the relative synchronization of the signals to one another (in the case of multilateration), or to the internal clock of receiver 101 (in the case of trilateration). FIG. 2 depicts a calibration method 200 that is used to determine the relative synchronization of the signals to one another, or to an internal clock of receiver 101.

At step 201, the receiver 101 receives one or more signals, such as the signals of opportunity described above, that may be used in a later position determination. The receiver 101 analyses the electromagnetic radiation received at one or more antennas in order to detect any signals, such as the signals of opportunity described above, that are present/can be received at the receiver's present location. In particular, the receiver 101 may filter a wideband sample at any number of frequencies of interest to determine if a signal is present at that frequency, e.g. by determining a signal to noise ratio. The receiver 101 receives the signals at an initial known position. The initial known position may be known based on a functional GNSS receiver, a known location based on geographic surroundings or monuments, map reading, or any other available method of positioning.

At step 202, once the signals have been detected and the initial known position established, the receiver 101 analyses the received signal to determine characteristics that identify the signal, and thus the signal's source, in order to determine the position of a signal source from a received signal. For example, the MSF signal referred to above is broadcast at a frequency of 60 kHz and uses a defined signal structure to encode time information.

At step 203, from the determined characteristics of the signal, e.g. the frequency and protocol, the receiver 101 looks up the corresponding position of the signal source from the positions of signal sources stored in the memory of the receiver 101. Of course, it will be appreciated that other characteristics of the signal may be used in addition to or instead of the frequency and/or protocol. Furthermore, where signals of opportunity include position information encoded in the signal along with timing information, the position can be obtained directly from the signal without reference to the position data stored in the memory of the receiver 101.

At step 204, the receiver 101 uses the positions of the signal sources 102a-b to calculate the travel time of the signals, i.e. the time taken for the signals to reach the receiver 101 from the signal sources 102a-b, based on the speed of propagation and the propagation distance between the receiver 101 and the signal sources 102a-b.

At step 205, the propagation times of the signals are then subtracted from the timing information received as part of the signals in order to determine the relative synchronization, or time offset, of the timing information relative to the timing information of other signals or relative to a local clock, e.g. an internal clock of the receiver 101. The timing references in a radio time signal, for example, are very accurate and often based on atomic clocks, so the synchronization of the timing information in the radio time signals, i.e. the offset, relative to other timing references is much more stable than the synchronization or offset with respect to an internal clock of the receiver 101.

At step 206, the synchronization information, i.e. the offset, is stored in a memory of the receiver.

It will be appreciated that while the calibration method 200 described above needs to be performed in order to determine the synchronization information, the method 200 may, but need not, be performed by the same receiver 101 that subsequently uses the synchronization information to determine an unknown position, as described below with respect to FIG. 3.

Furthermore, the calibration method 200 may be repeated at regular or irregular intervals in order to correct for drift between the timing information contained in the signals and, if used, the internal clock of the receiver 101. For example, where higher frequency signals are used, the calibration method 200 may need to be repeated relatively frequently in order to maintain the system's accuracy due to the changing travel times caused by the increased influence of skywaves, e.g. at least twice per day. Where lower frequency signals are used and where the synchronization information defines an offset between the time signals themselves, rather than a clock of the receiver 101, the relative drift will be much smaller and the calibration method 200 may need to be performed much less frequently, e.g. once per week, month or longer. Where the synchronization information defines an offset between the time signals and a clock of the receiver, the calibration method 200 or part thereof may be repeated much more often to account for drift in the internal clock, e.g. once per hour, or every time a known initial position can be determined.

It will also be appreciated that the calibration method 200 does not need to be repeated for every possible pairing of signals. If synchronization information has already been determined for signals A and B, and the synchronization information defines an offset between the timing information of signal A and the timing information of signal B, then the offset between signal A and signal C can be calculated based on a measured offset between signals B and C without requiring separate measurement of the offset between signals A and C.

The accuracy of the calibration method can be further improved by repeating the calibration method 200 at multiple initial known positions. For example, where the receiver 101 of the present invention is provided in a composite system with another accurate positioning system(s), such as a GNSS receiver, the calibration method 200 may be repeated at multiple known initial positions as long as the other positioning system(s) is functional.

Figure 3:
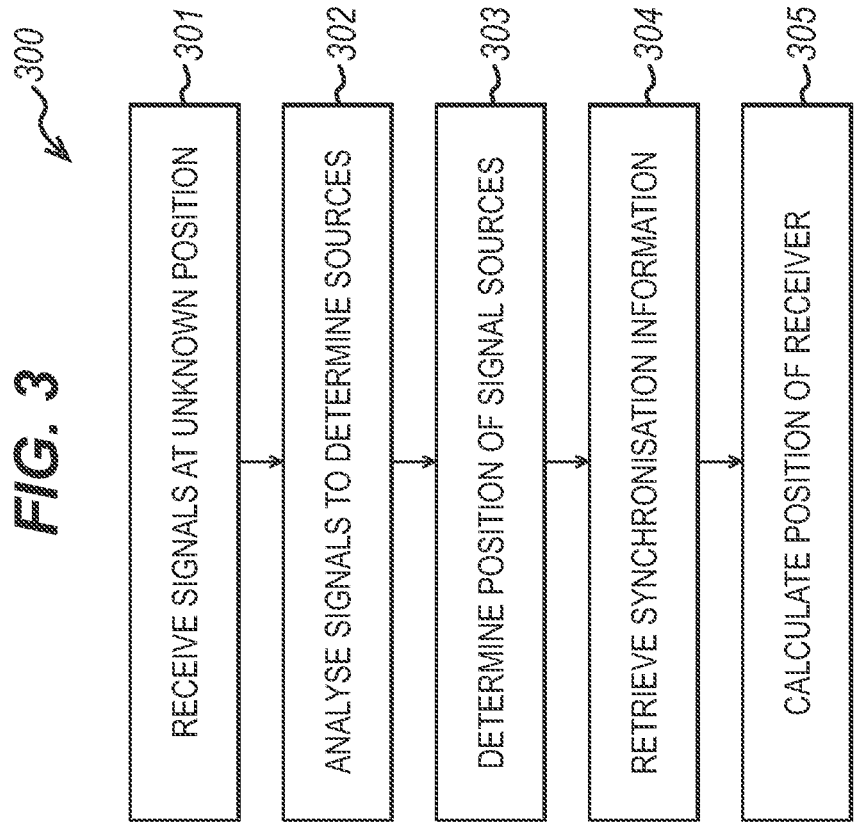
FIG. 3 depicts a positioning method of the present invention.

FIG. 3 depicts a method 300 of determining the position of the receiver 101 based on known synchronization, which may have been determined by the receiver 101, or a different receiver, using the calibration method 200 described above.

At step 301, the receiver 101 detects and receives two or more signals, such as the signals of opportunity, containing timing information, as described with respect to step 201 above. At this point, the position of the receiver 101 may be completely unknown, or may be known with low accuracy or high uncertainty. For example, if the positioning method 300 is used as a stand-alone positioning system, the current position of the receiver 101 may be unknown if the receiver 101 has moved since a previous position determination. However, if the positioning method 300 is used in conjunction with an inertial positioning system and dead reckoning techniques, the location of the receiver 101 may be known, albeit it with relatively low accuracy, i.e. to a lower accuracy than the positioning method 300 can provide.

At step 302 and 303, the receiver 101 analyses the received signals to determine the sources of the signals and retrieves or otherwise determines the positions of the signal sources, as described above with respect to method 200 at steps 202 and 203.

At step 304, the receiver 101 retrieves the relevant synchronization information, i.e. synchronization information relevant to the particular received signals, from the memory of the receiver 101 or any other suitable source, such as a network location. The relevant synchronization information may be identified in much the same way as the sources of the signals.

Figure 5A:
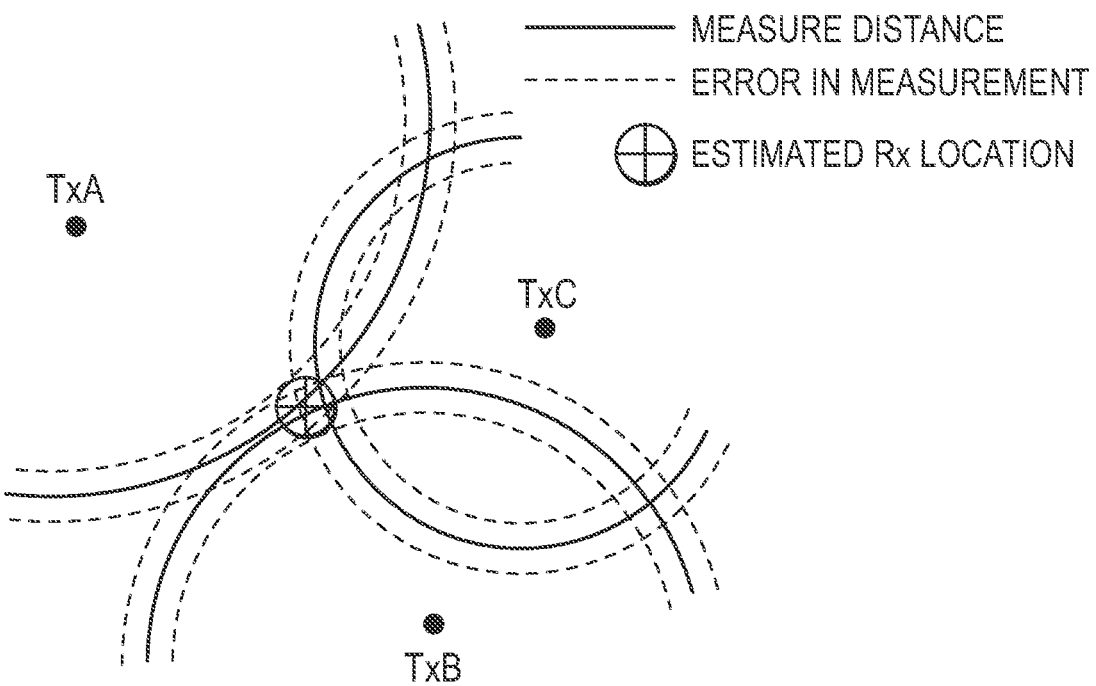
FIGS. 5a and 5b depicting the methods of trilateration and multilateration used in the present invention.
Figure 5B:
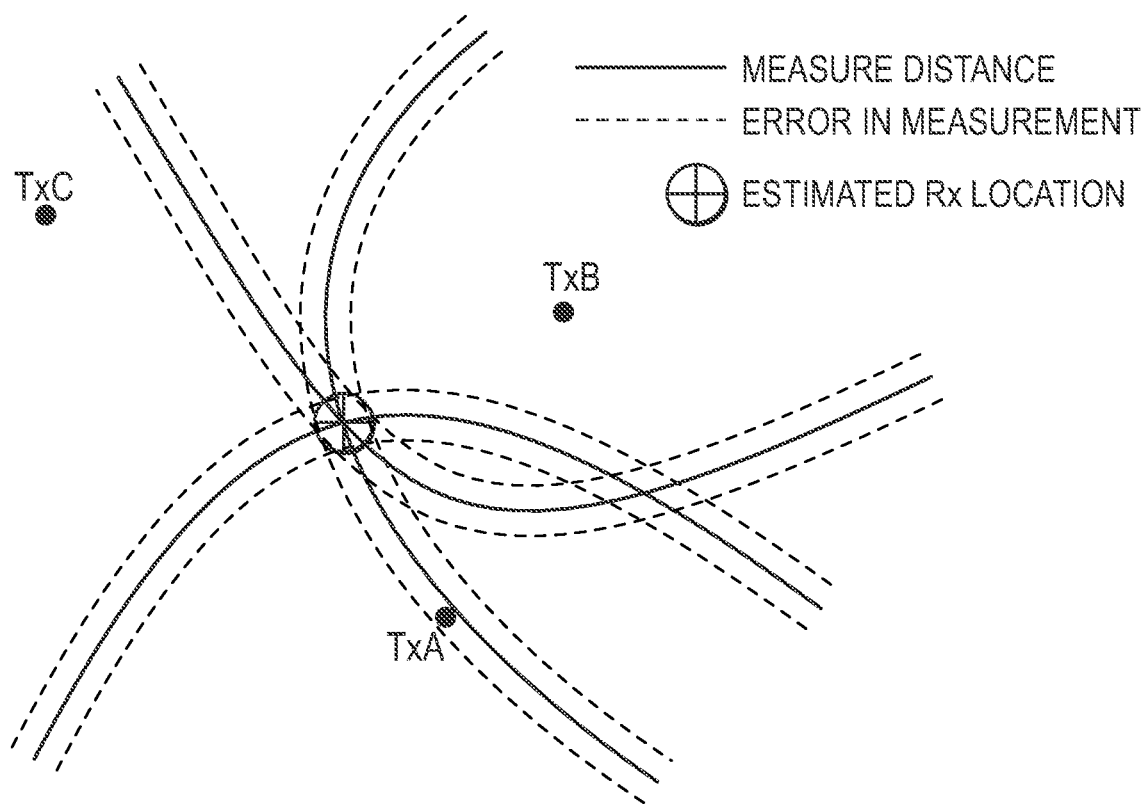

At step 305, once the synchronization information has been retrieved, the receiver 101 calculates the position of the receiver 101. In the case that a local reference clock is available, the synchronization information is used to apply corrections to the measured time of arrivals for each of the received signals. The position of the signal sources T×A, T×B and T×C, time of arrivals and the propagation speed is then used to calculate the distance from each of the source transmitters. Trilateration calculations, projected onto a model of the Earth's surface (for example WGS84 or other), may then be applied to estimate the receiver's position as shown in FIG. 5a. In the case that an accurate local clock is not available, the time difference of arrival between the received signals, and hence the distance ratio between two signal sources, and multilateration calculations may be used to estimate receiver location as shown in FIG. 5b. Systematic errors—owing to the estimation of signal timings, the synchronization information, the model of Earth used, estimation of the signal propagation speed and other factors—may result in an uncertainty, and/or potentially conflicts, in the distance circles (or hyperbolic curves, in the case of multilateration) and therefore location of intersections shown in FIGS. 5a and 5b. Position will likely be estimated (using iterative methods or other) as the best fit location at which the combined error between the calculated distances, between the estimated location and the signal sources, and the measured distances, between the estimated location and the signal sources, is minimized. It will be appreciated that while FIGS. 5a and 5b show three signal sources T×A, T×B and T×C, any number of signals and signal sources greater than or equal to two may be used. Whilst three sources are useful to provide an unambiguous position solution, two sources would provide two possible positions and the system could be configured to reject one of the possible positions based on other information, such as it being on land for a sea-based application of vice-versa.

As mentioned above, the system 100 may further include one or more ad-hoc transmitters 103. The ad-hoc transmitter 103 is configured to re-transmit a weak signal of opportunity (at the same or a different frequency) or to transmit an original signal containing timing reference information. The ad-hoc transmitter 103 can be deployed in environments where signals of opportunity are sparse or weak in order to provide further coverage of a particular area and increase the accuracy of the positioning system and method. Moreover, the signals broadcast by the ad-hoc transmitters 103 may be the only signals that are used by the receiver 101 to determine its position.

While radio time signals are based on one or more atomic clocks, which are exceptionally accurate, it is expensive to provide ad-hoc antennas for deployment in the field which contain their own atomic clocks. It is therefore possible for the ad-hoc transmitter 103 to either retransmit a weak radio time signal, or use the weak radio time signal as a timing reference to generate its own signal. Of course, it is increasingly possible to provide ad-hoc transmitters with their own atomic clocks (or other accurate timing sources), which can be used in the present system and method without relying on any external timing references, such as the radio time signals. While these atomic clocks are generally less accurate and stable than those used in the production of radio time signals, they are accurate enough to provide signals that can be used to determine an accurate position using the present invention for more limited time periods. As long as the receiver 101 is aware of the position of the ad-hoc transmitter 103, the ad-hoc transmitter can be used by the receiver 101 to determine its position, along with received signals of opportunity, in the same way as described above with respect to FIG. 3. The position of the ad-hoc transmitter may be fixed or may be moving, for example on a naval (or airborne) vessel. As long as the position of the transmitter at any given time is known by the receiver 101, the ad-hoc transmitter 103 can still be used by the receiver 101 in the determination of its position.

While the present system and method are capable of operating in isolation of other positioning systems, in practice the use of radio time signals, or other similar signals, in the longwave band means that the signals must be received for a relatively long time in order to obtain the necessary information to determine the position of the receiver 101. This is owing to the low signal bandwidth. Thus, the present system and method excels when deployed alongside another non-GNSS navigation system, such as a dead-reckoning system based on inertial measurements, as mentioned above. Advantageously, the present system and method offset the weaknesses of an inertial measurement system and, in turn, an inertial measurement system offsets the weakness of the present system and method. In particular, inertial measurement systems are capable of providing rapid updates in position, but have a tendency to drift away from the true position over time. The present system and method takes time to receive the longwave signals and determine the position of the receiver, but does not suffer from the same drift as an inertial measurement system. Thus, when used in combination, an inertial measurement system can be used to provide rapid updates to the position of the receiver, while the method described above with respect to FIG. 3 can be used to periodically correct the drift in the inertial measurement system. The method of FIG. 3 can therefore be extended, as depicted in FIG. 4.

Steps 401 to 405 of FIG. 4 proceed as outlined above with respect to FIG. 3. At step 406, the position calculated at step 405 is used to re-calibrate the inertial measurement system of the receiver 101 in order to correct for drift. At step 407, the position of the receiver 101 is continuously output and updated based on the inertial measurement system. Simultaneously, the process loops back to step 401 in order to begin calculating the position based on signals of opportunity again and continuously re-calibrate the inertial measurement system.

What is claimed is:

1. A method for determining a position of a device, the method comprising:
receiving, at an initial known position of the device, two or more electromagnetic signals, wherein each electromagnetic signal comprises timing information and is provided from a separate fixed terrestrial or geostationary source;

determining a position of the source of each electromagnetic signal;
determining at least one offset between the timing information contained in the electromagnetic signals based on the initial known position of the device and the positions of the sources determined for the initial known position;
storing the at least one offset as synchronization information in a memory of the device;
receiving, at a second position different from the initial known position of the device, the two or more electromagnetic signals;
again determining a position of the source of each electromagnetic signal;
retrieving, from the memory of the device, the synchronization information defining the at least one offset between the timing information contained in the electromagnetic signals; and
determining the second position of the device based on the timing information of each electromagnetic signal, the synchronization information, and the position of each signal source determined for the second position.

2. The method of claim 1, wherein the initial known position of the device is determined based on an output of a co-located global navigation satellite system (GNSS) receiver or is manually input.

3. The method of claim 1, further comprising, at each of one or more further known positions of the device:
receiving the two or more electromagnetic signals;
determining the position of the source of each electromagnetic signal;
determining the at least one offset between the timing information contained in the electromagnetic signals based on the further known position of the device and the positions of the sources determined for the further known position; and
refining and storing the synchronization information determined at the initial known position and at the one or more further known positions in the memory of the device.

4. The method of claim 1, further comprising, at a later known position of the device at a later point in time:
receiving the two or more electromagnetic signals;
determining the position of the source of each electromagnetic signal;
determining the at least one offset between the timing information contained in the electromagnetic signals based on the later known position of the device and the positions of the sources determined for the later known position; and
replacing the synchronization information stored in the memory of the device with the synchronization information determined at the later point in time.

5. The method of claim 1, wherein determining the position of the source of each electromagnetic signal comprises:
analyzing each received electromagnetic signal to determine one or more characteristics of the received electromagnetic signal; and
retrieving, from the memory of the device, the position of the source of the received electromagnetic signal based on the one or more determined characteristics of the received electromagnetic signal.

6. The method of claim 1, wherein determining the position of the source of each electromagnetic signal comprises:
identifying, within each received electromagnetic signal, an indication of the position of the source of the received electromagnetic signal.

7. The method of claim 1, wherein determining the second position of the device comprises performing trilateration or multilateration.

8. The method of claim 1, wherein the two or more electromagnetic signals comprise at least one of: radio time signals, television signals, radio signals, ad-hoc signals, navigational aids, or non-directional beacons.

9. The method of claim 1, further comprising:
broadcasting one or more signals comprising timing information from one or more ad-hoc transmitters at one or more of: at least one fixed terrestrial position, at least one fixed geostationary position, or at least one known moving position;
wherein the two or more electromagnetic signals comprise the one or more signals broadcast from the one or more ad-hoc transmitters.

10. A method for determining a position of a device, the method comprising:
receiving, at the device, two or more electromagnetic signals, wherein each electromagnetic signal comprises timing information and is provided from a separate fixed terrestrial or geostationary source;
determining a position of the source of each electromagnetic signal;
retrieving, from a memory of the device, synchronization information defining at least one offset between the timing information contained in the electromagnetic signals;
determining the position of the device based on the timing information of each electromagnetic signal, the synchronization information, and the position of each signal source; and
subsequent to determining an updated position of the device:
receiving the two or more electromagnetic signals;
determining the position of the source of each electromagnetic signal;
retrieving the synchronization information; and
determining a further updated position of the device.

11. The method of claim 10, further comprising, at an initial known position of the device:
receiving the two or more electromagnetic signals;
determining the position of the source of each electromagnetic signal;
determining the at least one offset between the timing information contained in the electromagnetic signals based on the initial known position of the device and the positions of the sources determined for the initial known position; and
storing the at least one offset as the synchronization information in the memory of the device.

12. A device comprising:
a memory;
a receiver configured to receive two or more electromagnetic signals, wherein each electromagnetic signal comprises timing information and is provided from a separate fixed terrestrial or geostationary source; and
a processor configured to:
determine, at an initial known position of the device, a position of the source of each electromagnetic signal;
determine at least one offset between the timing information contained in the electromagnetic signals based on the initial known position of the device and the positions of the sources determined for the initial known position;

store the at least one offset as synchronization information in the memory;

determine, at a second position different from the initial known position of the device, a position of the source of each electromagnetic signal;

retrieve, from the memory, the synchronization information defining the at least one offset between the timing information contained in the electromagnetic signals; and determine the position of the device based on the timing information of each electromagnetic signal, the synchronization information, and the position of each signal source determined for the second position.

13. The device of claim 12, wherein the processor is configured to determine the initial known position of the device based on an output of a co-located global navigation satellite system (GNSS) receiver or manual input.

14. The device of claim 12, wherein, at each of one or more further known positions of the device:

the receiver is configured to receive the two or more electromagnetic signals; and the processor is configured to:
 determine the position of the source of each electromagnetic signal;
 determine the at least one offset between the timing information contained in the electromagnetic signals based on the further known position of the device and the positions of the sources determined for the further known position; and
 refine and store the synchronization information determined at the initial known position and the one or more further known positions in the memory.

15. The device of claim 12, wherein, at a later known position of the device at a later point in time:

the receiver is configured to receive the two or more electromagnetic signals; and the processor is configured to:
 determine the position of the source of each electromagnetic signal;
 determine the at least one offset between the timing information contained in the electromagnetic signals based on the later known position of the device and the positions of the sources determined for the later known position; and
 replace the synchronization information stored in the memory with the synchronization information determined at the later point in time.

16. The device of claim 12, wherein, to determine the position of the source of each electromagnetic signal, the processor is configured to:

analyze each received electromagnetic signal to determine one or more characteristics of the received electromagnetic signal; and retrieve, from the memory, the position of the source of the received electromagnetic signal based on the one or more determined characteristics of the received electromagnetic signal.

17. The device of claim 12, wherein, to determine the position of the source of each electromagnetic signal, the processor is configured to:

identify, within each received electromagnetic signal, an indication of the position of the source of the received electromagnetic signal.

18. The device of claim 12, wherein, to determine the second position of the device, the processor is configured to perform trilateration or multilateration.

19. The device of claim 12, wherein the two or more electromagnetic signals comprise at least one of: radio time signals, television signals, radio signals, ad-hoc signals, navigational aids, or non-directional beacons.

20. A device comprising:

a memory;

a receiver configured to receive two or more electromagnetic signals, wherein each electromagnetic signal comprises timing information and is provided from a separate fixed terrestrial or geostationary source; and a processor configured to:
 determine a position of the source of each electromagnetic signal;
 retrieve, from the memory, synchronization information defining at least one offset between the timing information contained in the electromagnetic signals; and
 determine the position of the device based on the timing information of each electromagnetic signal, the synchronization information, and the position of each signal source;

wherein, subsequent to a determination of an updated position of the device:
 the receiver is configured to receive the two or more electromagnetic signals; and
 the processor is configured to:
  determine the position of the source of each electromagnetic signal;
  retrieve the synchronization information; and
  determine a further updated position of the device.

21. The device of claim 20, wherein, at an initial known position of the device:

the receiver is configured to receive the two or more electromagnetic signals; and the processor is configured to:
 determine the position of the source of each electromagnetic signal;
 determine the at least one offset between the timing information contained in the electromagnetic signals based on the initial known position of the device and the positions of the sources determined for the initial known position; and
 store the at least one offset as the synchronization information in the memory.

* * * * *

UNITED STATES PATENT AND TRADEMARK OFFICE
CERTIFICATE OF CORRECTION

PATENT NO. : 11,395,103 B2  
APPLICATION NO. : 16/946566  
DATED : July 19, 2022  
INVENTOR(S) : David R. Tegerdine et al.

Page 1 of 1

It is certified that error appears in the above-identified patent and that said Letters Patent is hereby corrected as shown below:

On the Title Page

Column 1, Item (30), Line 1, "1909369" should read --1909369.9--.

Signed and Sealed this  
Twenty-seventh Day of September, 2022

Katherine Kelly Vidal  
*Director of the United States Patent and Trademark Office*